US012707553B2

(12) United States Patent
Cabrol et al.

(10) Patent No.: US 12,707,553 B2
(45) Date of Patent: Aug. 11, 2026

(54) SYSTEMS AND METHODS FOR A HIGH VOLTAGE GENERATOR OF AN INTERVENTIONAL IMAGING SYSTEM

(71) Applicant: GE Precision Healthcare LLC, Waukesha, WI (US)

(72) Inventors: Loïc Cabrol, Buc (FR); Yann Casteignau, Buc (FR); Nicolas Levilly, Buc (FR); Baptiste Salvi, Buc (FR)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 190 days.

(21) Appl. No.: 18/611,409

(22) Filed: Mar. 20, 2024

(65) Prior Publication Data

US 2025/0301558 A1 Sep. 25, 2025

(51) Int. Cl.
*H05G 1/32* (2006.01)
*H05G 1/20* (2006.01)
*H05G 1/34* (2006.01)

(52) U.S. Cl.
CPC ................. *H05G 1/32* (2013.01); *H05G 1/20* (2013.01); *H05G 1/34* (2013.01)

(58) Field of Classification Search
CPC ............ H05G 1/085; H05G 1/20; H05G 1/22; H05G 1/32; H05G 1/34; H05G 1/56; H05G 1/58; H05G 1/10; H05G 1/24
See application file for complete search history.

(56) References Cited

U.S. PATENT DOCUMENTS

| | | | | |
|---|---|---|---|---|
| 5,077,771 | A * | 12/1991 | Skillicorn | H05G 1/06 378/102 |
| 6,181,580 | B1 * | 1/2001 | Laskai | H02M 1/10 363/133 |
| 7,742,571 | B1 * | 6/2010 | Krzystyniak | H05G 1/20 378/101 |
| 9,253,864 | B2 * | 2/2016 | Caiafa | H05G 1/50 |
| 9,532,759 | B2 * | 1/2017 | Taguchi | A61B 6/032 |
| 10,159,455 | B2 | 12/2018 | Takanaka et al. | |
| 10,194,877 | B2 * | 2/2019 | Bernhardt | H05G 1/34 |
| 11,771,388 | B2 * | 10/2023 | Ganguly | A61B 6/482 378/46 |
| 2003/0210764 | A1 * | 11/2003 | Tekletsadik | H05G 1/20 378/106 |
| 2006/0115050 | A1 * | 6/2006 | Resnick | H01J 35/147 378/108 |
| 2007/0248213 | A1 * | 10/2007 | Dolgonos | H05G 1/20 378/106 |

(Continued)

*Primary Examiner* — David J Makiya
*Assistant Examiner* — Soorena Kefayati
(74) *Attorney, Agent, or Firm* — McCoy Russell LLP

(57) ABSTRACT

Systems and methods for controlling a high voltage generator of an interventional imaging system are provided herein. In one example, a method for an interventional imaging system includes generating a plurality of X-ray pulses with an X-ray tube of the interventional imaging system, each X-ray pulse generated by supplying voltage to the X-ray tube from a high voltage generator and opening a gridding electrode of the X-ray tube, and turning off the high voltage generator between each X-ray pulse. In some examples, the high voltage generator may be reactivated prior to each X-ray pulse according to a command signal that anticipates an actual start time of each X-ray pulse.

15 Claims, 10 Drawing Sheets

(56) References Cited

U.S. PATENT DOCUMENTS

| | | | | |
|---|---|---|---|---|
| 2012/0121069 | A1* | 5/2012 | Aoki | H05G 1/12<br>378/104 |
| 2014/0161221 | A1* | 6/2014 | Miyazaki | H05G 1/085<br>378/16 |
| 2015/0245462 | A1* | 8/2015 | Nighan, Jr. | H05H 7/02<br>378/138 |
| 2016/0095568 | A1* | 4/2016 | Takanaka | A61B 6/54<br>378/111 |
| 2017/0295634 | A1* | 10/2017 | Garcia Tormo | H05G 1/12 |
| 2017/0347438 | A1* | 11/2017 | Kang | H05G 1/32 |
| 2018/0068823 | A1* | 3/2018 | Utschig | H05G 1/58 |
| 2018/0239052 | A1* | 8/2018 | Teague | H05G 1/32 |
| 2018/0249566 | A1* | 8/2018 | Proksa | H05G 1/50 |
| 2019/0116654 | A1* | 4/2019 | Miller | H01J 35/101 |
| 2019/0181857 | A1* | 6/2019 | Caiafa | H03K 17/691 |
| 2019/0250109 | A1* | 8/2019 | Yachi | A61B 6/54 |
| 2020/0367350 | A1* | 11/2020 | Fritz | H05G 1/34 |
| 2022/0053626 | A1* | 2/2022 | Deuringer | H05G 1/085 |
| 2023/0058177 | A1* | 2/2023 | Snyder | A61B 6/4042 |

* cited by examiner

SYSTEMS AND METHODS FOR A HIGH VOLTAGE GENERATOR OF AN INTERVENTIONAL IMAGING SYSTEM

TECHNICAL FIELD

The present description relates generally to medical imaging. More specifically, the present disclosure relates to reducing energy consumption in interventional X-ray imaging.

BACKGROUND

Interventional radiology encompasses a wide range of procedures that involve guiding small tools into the body and using an imaging system to track the progress of the insertion. One such imaging system is an interventional X-ray system. In some embodiments of an interventional X-ray system, X-ray pulses generated by an X-ray generator may be directed at a target. The X-ray generator includes an X-ray tube powered by a high voltage generator, and an electrode grid is configured to block the generation of X-rays from the X-ray tube. The X-ray tube may include a cathode and an anode. The high voltage generator may generate a large voltage difference between the cathode and the anode. The cathode may include a source of electrons that may accelerate towards the anode in the presence of the large voltage difference between the cathode and the anode. X-rays are generated when the electrons strike the anode.

BRIEF DESCRIPTION

In one example, a method for an interventional X-ray system includes generating a plurality of X-ray pulses with an X-ray tube of the interventional X-ray imaging system, each X-ray pulse generated by supplying voltage to the X-ray tube from a high voltage generator and opening a grid of the X-ray tube, and turning off the high voltage generator between each X-ray pulse. In this way, the high voltage generator is powered off during portions of an X-ray procedure and therefore demands less power to operate and generates less heat during the X-ray procedure.

As one example, the voltage between the cathode and anode may decay slowly when the high voltage generator is powered off. When the high voltage generator is powered off between X-ray pulses, the voltage between the cathode and anode diminishes slowly over time due to capacitive effects of cables in the system. Therefore, it is possible to return the voltage to the cathode and anode to the voltage required for the creation of an X-ray pulse within a small duration of time if the high voltage generator is turned on. Due to the capacitive effects of cables, the method may include initiating an X-ray pulse by turning on the high voltage generator a predetermined amount of time before the grid is opened. The X-ray pulse may be terminated by closing the grid and turning off the high voltage generator. This method allows the voltage between the cathode and the anode to be at the value required for the production of X-rays required for the procedure, while allowing the X-ray generator to remain powered off for portions of the X-ray procedure. Powering off the high voltage generator allows the thermal stress on the high voltage generator to be minimized and further allows the high voltage generator to draw less power during operation.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
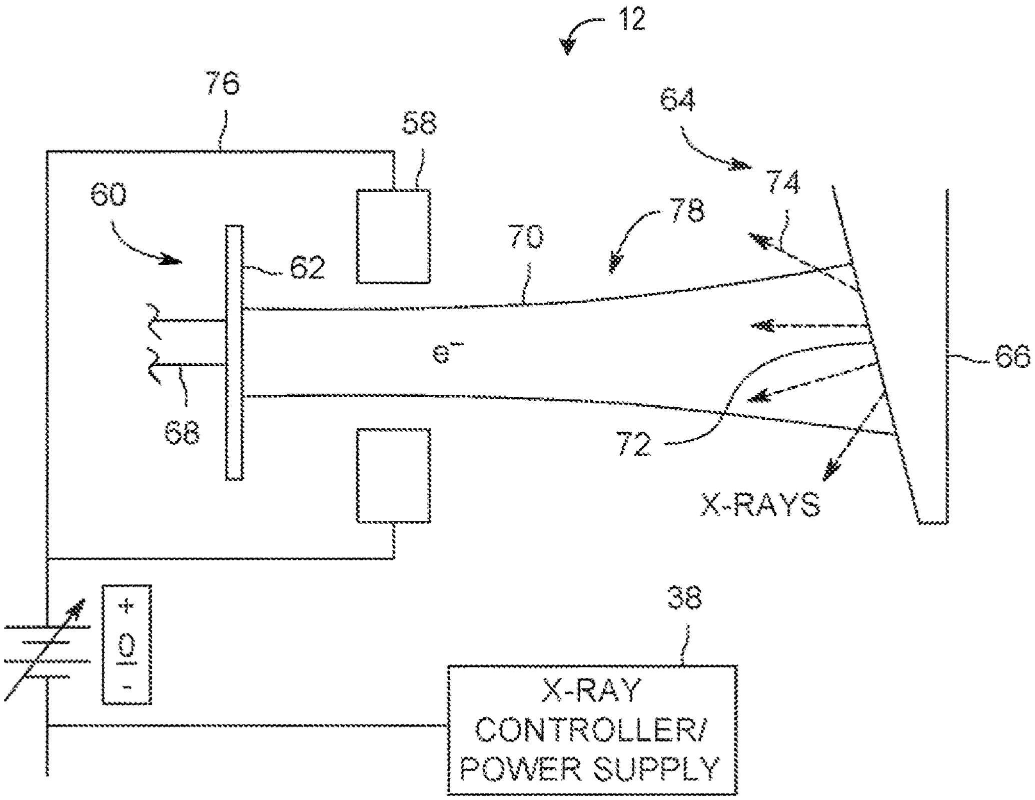
FIG. 1 is a schematic illustration of an embodiment of a portion of an X-ray tube (e.g., having a gridding electrode) coupled to an X-ray controller/power supply (e.g., with no gridding of an electron beam), in accordance with various embodiments

The following description relates to systems and methods for producing and controlling X-ray pulses in imaging system, such as an interventional X-ray system. An interventional X-ray system may include an X-ray controller coupled to a high voltage generator and an X-ray tube having a gridding electrode, also referred to as an electrode grid. The X-ray tube may include a cathode assembly configured to generate an electron beam, an anode assembly, and the gridding electrode disposed between the cathode assembly and the anode assembly. The high voltage generator may power the X-ray tube (e.g., by powering the cathode assembly to generate an electron beam) and gridding electrode.

The gridding electrode, when powered on, may be capable of preventing electrons from reaching the anode. The gridding electrode is disposed between the cathode and anode. When a significant negative voltage is applied to the gridding electrode, the positive voltage at the anode is masked, and the electrons emitted by the cathode are no longer attracted to the anode. Thus, if the negative voltage is applied to the gridding electrode, electrons no longer strike the anode and no X-rays are emitted. Because no X-rays are emitted when the negative voltage is applied to the gridding electrode, the X-ray tube may be considered closed when the negative voltage is applied. Similarly, the tube may be considered open when no negative voltage is applied. To create a pulsed X-ray beam, the gridding electrode may operate in a pulsed mode, alternately blocking X-ray emissions and allowing X-ray emissions at a specified frequency and for a specified pulse duration. Interventional imaging systems may be configured to image a subject such as a patient for a relatively long time period, such as minutes, in order to provide live images/videos of the subject to guide placement of an interventional device. As such, interventional imaging systems may be controlled to produce X-ray pulses during the course of an imaging procedure, wherein each X-ray pulse generates sufficient X-rays to produce one image. The X-ray pulses may be produced at a rate set by the imaging system based on the anatomy being imaged, for example.

In conventional systems, the high voltage generator may operate to provide a high voltage difference between the cathode and the anode during the entirety of the X-ray imaging procedure, including when the gridding electrode is closed. The high voltage generator can become thermally stressed when it operates for extended periods of time. Thermal stress can cause degradation to components of the high voltage generator and/or prolonged thermal stress may result in increased maintenance to the high voltage generator. Additionally, large amounts of power are demanded to operate the high voltage generator.

Thus, according to embodiments disclosed herein, the high voltage generator may be powered off in between X-ray pulses to save energy and reduce heating of the power electronics of the high voltage generator. To ensure the high voltage generator is able to provide an appropriate voltage to the X-ray tube when an X-ray pulse is commanded to begin, the high voltage generator may receive a signal (e.g., from a controller coupled to the high voltage generator) to activate/turn on the high voltage generator that anticipates the start of the X-ray pulse by a predefined amount, such as 1 ms, which allows the high voltage generator to reach a desired voltage for initiating the X-ray pulse at the time that the X-ray pulse is commanded to begin. Additionally, the high voltage generator may be activated in between X-ray pulses if indicated to ensure the voltage of the high voltage generator does not decrease below a threshold.

In this way, the high voltage generator may only be powered on for a portion of the duration of an X-ray imaging procedure. Depending on the particular X-ray imaging procedure, the time between pulses may be 66%-99% of the total procedure duration. The high voltage generator may be powered off for most of the time between pulses, which allows the high voltage generator to be turned off for a significant portion of the procedure. The high voltage generator will draw less power and generate less heat when it is powered off. Generating less heat may prevent thermal stress on components of the high voltage generator, which may extend its lifespan and reduce maintenance.

Figure 2:
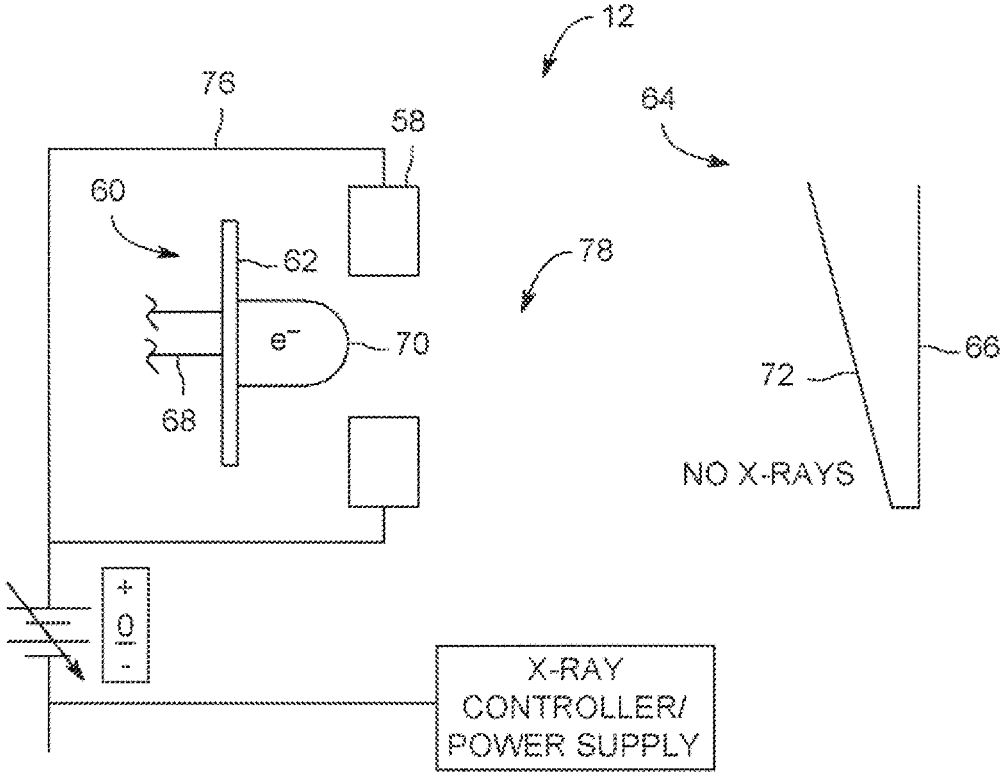
FIG. 2 is a schematic illustration of an embodiment of a portion of an X-ray tube (e.g., having a gridding electrode) coupled to an X-ray controller/power supply (e.g., with gridding of an electron beam), in accordance with various embodiments.

FIGS. 1 and 2 are schematic illustrations of an embodiment of a portion of an X-ray tube 12 (e.g., having a gridding electrode 58) coupled to an X-ray controller/power supply 38. The X-ray tube 12 includes an electron beam source 60 including a cathode 62, an anode assembly 64 including an anode 66, and a gridding electrode 58. The cathode 62, anode 66, and the gridding electrode 58 may be disposed within an enclosure (not shown) such as a glass or metallic envelope. The X-ray tube 12 may be positioned within a casing (not shown) which may be made of aluminum and lined with lead. In certain embodiments, the anode assembly 64 may include a rotor and a stator (not shown) outside of the X-ray tube 12 at least partially surrounding the rotor for causing rotation of an anode 66 during operation.

The cathode 62 is configured to receive electrical signals via a series of electrical leads 68 (e.g., coupled to a high voltage source) that cause emission of an electron beam 70. The anode 66 is configured to receive the electron beam 70 on a target surface 72 and to emit X-rays, as indicated by dashed lines 74, when impacted by the electron beam 70 as depicted in FIG. 1. The electrical signals may be timing/control signals (via the X-ray controller/power supply 38) that cause the cathode 62 to emit the electron beam 70 at one or more energies. Further, the electrical signals may at least partially control the potential between the cathode 62 and the anode 66. The voltage difference between the cathode 62 and the anode 66 may range from tens of kilovolts to 125 kilovolts in some examples. The anode 66 is coupled to the rotor (not shown) via a shaft (not shown). Rotation of the anode 66 allows the electron beam 70 to constantly strike a different point on the anode perimeter. Within the enclosure of the X-ray tube 12, a vacuum of the order of $10^{-5}$ to about $10^{-9}$ torr at room temperature is preferably maintained to permit unperturbed transmission of the electron beam 70 between the cathode 62 and the anode 66.

The gridding electrode 58 is configured to receive electrical signals via a series of electrical leads 76 that cause the gridding electrode 58 to grid the electron beam 70. The electrical signals may be timing/control signals (via the X-ray controller/power supply 38) that cause the gridding electrode 58, when energized or powered to a specific level (e.g., between −5000V and −6000V), to grid the electron beam 70. The gridding electrode 58 is disposed about a path 78 of the electron beam 70 between the electron beam source 60 (e.g., cathode 62) and the anode assembly 64 (e.g., anode 66). The gridding electrode 58 may be annularly shaped. When the gridding electrode 58 is powered to a specific level (e.g., −5000 V to −6000 V), the electron beam 70 may be fully gridded or blocked from impacting the anode 66, as shown in FIG. 2. If the gridding electrode 58 is powered at a specific non-gridding level (e.g., between −1000V and 0V), gridding of the electron beam 70 does not occur (as depicted in FIG. 1). The gridding of the electron beam 70 may occur in a binary manner (e.g., on (no gridding)/off (gridding)).

Figure 3:
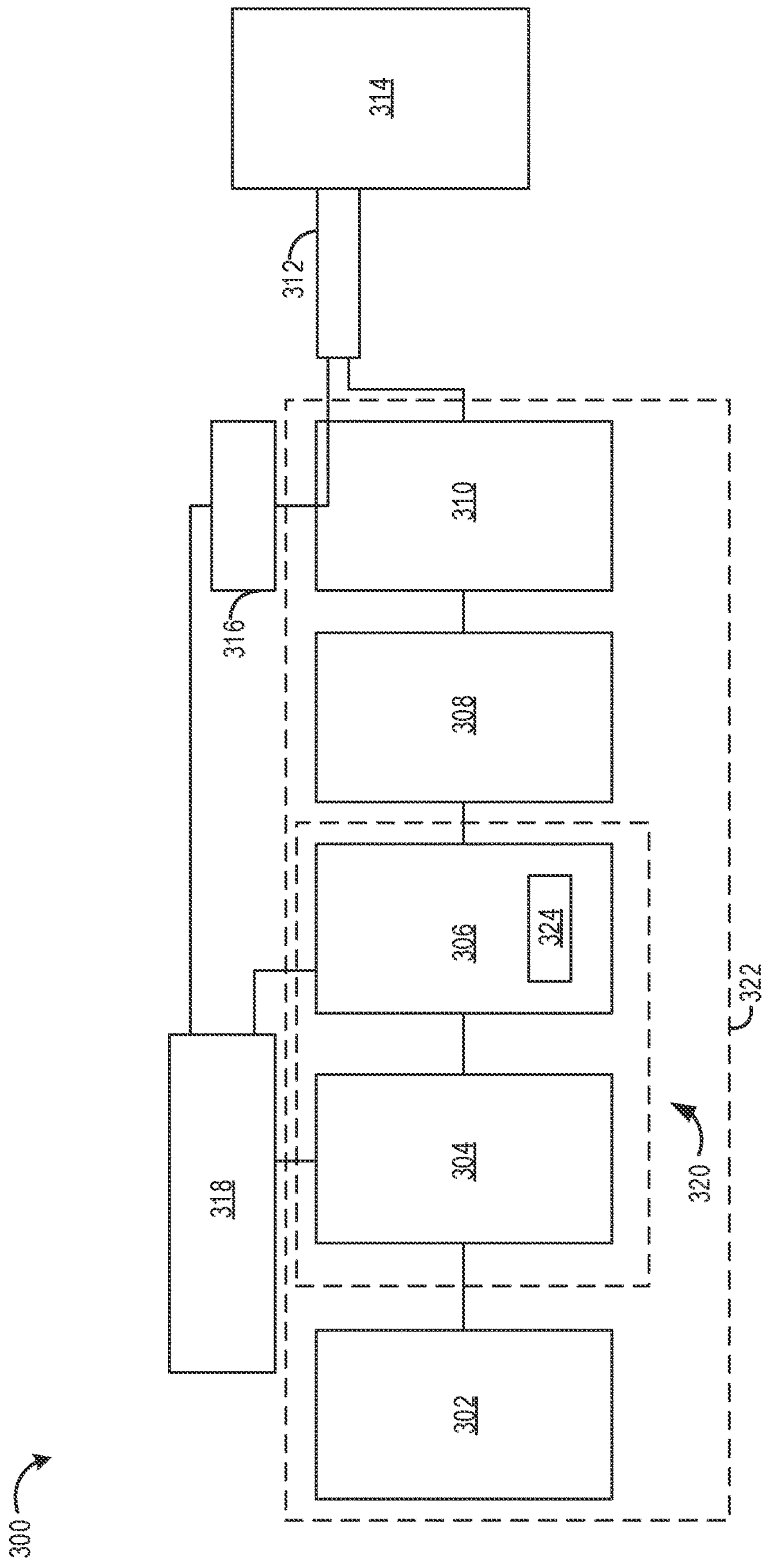
FIG. 3 is a system diagram of an embodiment of a high voltage generator.

FIG. 3 is a schematic diagram of an embodiment of an X-ray generator 300. Aspects of the X-ray generator 300 may be included in the X-ray controller/power supply 38 of FIGS. 1 and 2. Further, the X-ray generator 300 may be incorporated into an imaging system, such as the imaging system of FIG. 10 (explained in more detail below). The X-ray generator 300 may include a high voltage generator 322 coupled to or including a DC power supply 302. The high voltage generator 322 may include an inverter 320, a high voltage transformer 308, and a rectifier 310. The high voltage generator 322 may receive power from the DC power supply 302. The DC power supply 302 may supply power from batteries, an external power generator, or a connection to an external electrical grid. The DC power supply 302 may be coupled to the inverter 320. The inverter 320 may receive direct current from the DC power supply 302 and convert the direct current to a high frequency, approximately sinusoidal (e.g., AC) current. In some examples, the inverter 320 may include a hyper resonant inverter 304 coupled to a resonant circuit 306. The hyper resonant inverter 304 may be comprised of a plurality of diodes, transistors, and capacitors capable of converting an input current to an approximately sinusoidal (e.g., AC) current. The resonant circuit 306 may be comprised of a plurality of capacitors, inductors, and resistive elements.

The resonant circuit 306 may be coupled to the high voltage transformer 308. The high voltage transformer 308 may be capable of transforming an AC signal input to the transformer by the inverter 320 and output an AC signal with a higher voltage. The high voltage transformer 308 may be coupled to the rectifier 310. The rectifier 310 may be comprised of an arrangement of diodes and may be configured to transform an AC signal provided to the rectifier 310 by the high voltage transformer 308 to a DC signal. The DC signal produced by the rectifier 310 may be output via a high voltage cable 312 to an X-ray tube 314, which is a non-limiting example of X-ray tube 12 of FIGS. 1 and 2. In some examples, the high voltage cable 312 may be a relatively long cable (such as 40 meters) and may have significant capacitive effects that resist changes in the voltage provided by the high voltage generator 322. The capacitive effect of the high voltage cable 312 may allow the voltage provided to the X-ray tube 314 to decay slowly over time if the high voltage generator 322 is disabled.

The arrangement of the inverter 320, the high voltage transformer 308, and the rectifier 310 may provide a higher voltage DC signal to be output to the X-ray tube 314 than the voltage supplied by the DC power supply 302. In some examples, the high voltage generator apparatus may provide thousands of volts to the X-ray tube.

Figure 10:
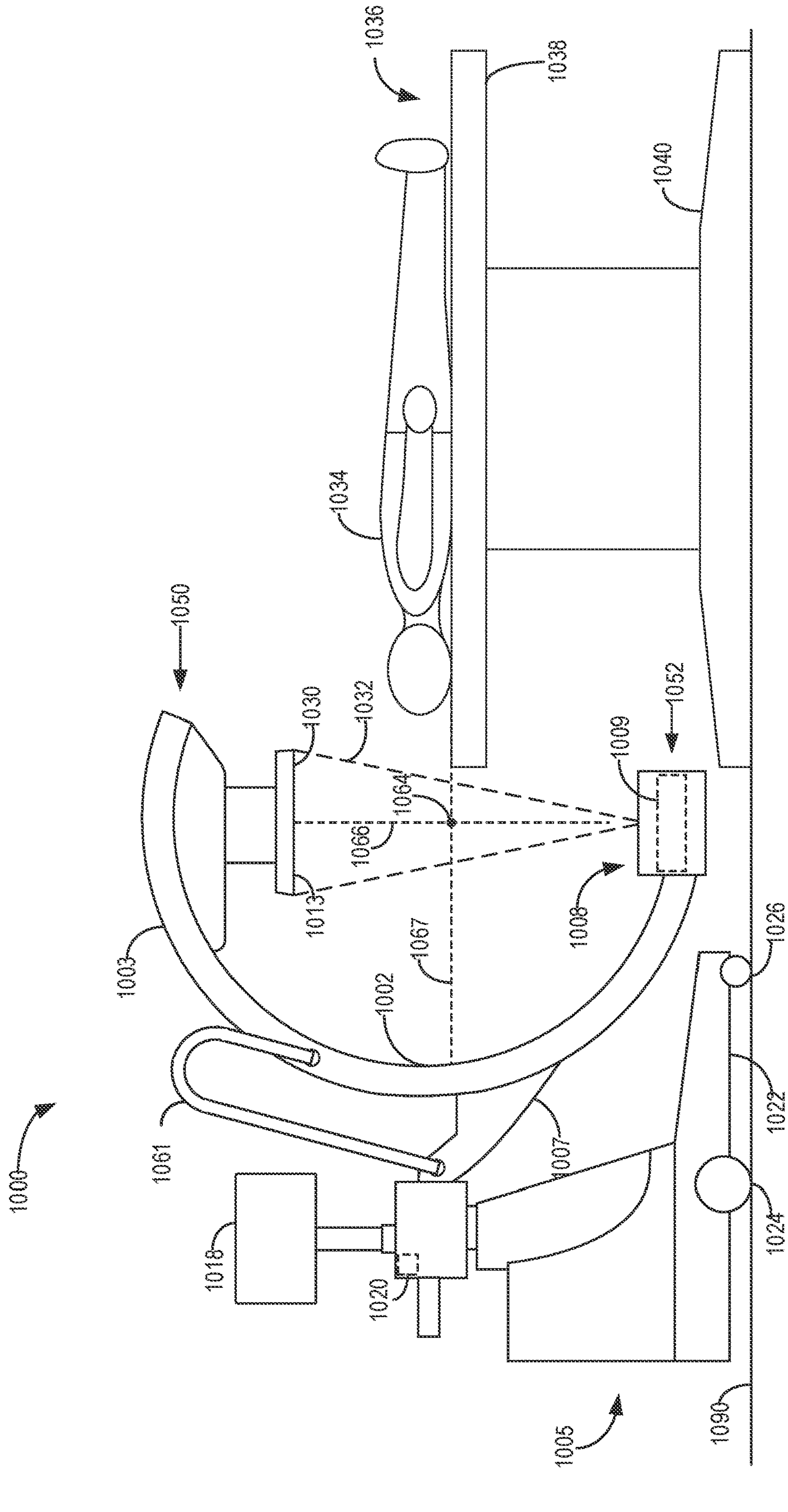
FIG. 10 is an example X-ray imaging system.

The X-ray generator 300 may further include a plurality of controllers coupled to various parts of the high voltage generator 322. For example, a high voltage controller 318 may be coupled to a control unit of an imaging system (not pictured in FIG. 3, though an example imaging system is shown in FIG. 10), the hyper resonant inverter 304, the resonant circuit 306, and a cathode controller 316. The high voltage controller 318 and the cathode controller 316 may each include memory storing instructions and one or more processors configured to execute the instructions. The high voltage controller 318 may receive information from the control unit of the imaging system relating to an imaging procedure being performed with the imaging system. The information may include a scan duration, a tube current for the scan, a tube voltage for the scan, an X-ray pulse rate, and a duration of the X-ray pulses requested for the scan.

The high voltage controller 318 may receive information pertaining to the operation of the high voltage generator via the coupling to the resonant circuit 306. The high voltage controller 318 may receive the inverter current, which may be hundreds of Amps, and the voltage being transferred to the high voltage transformer 308 from a plurality of sensors 324 coupled to elements of the resonant circuit 306. For example, the plurality of sensors 324 may include a current sensor to measure the current through the resonant circuit 306. The plurality of sensors may further include a voltmeter arranged in parallel with the high voltage transformer 308 to measure the voltage transferred to the transformer 308. The high voltage controller 318 may process the information provided by the sensors in the resonant circuit as well as the information provided by the imaging system to issue signals that control the operation of the high voltage generator. In some examples, the high voltage controller 318 may issue commands for the inverter 320 to shut off in between X-ray pulses during an X-ray procedure. Deactivating/shutting off the inverter may prevent the high voltage generator 322 from providing voltage to the X-ray tube 314. The high voltage controller 318 may additionally issue commands to a cathode controller 316 that controls the operation of a gridding electrode of the X-ray tube 314 (e.g., the gridding electrode 58). The cathode controller 316 may then open or close the gridding electrode 58 by controlling the voltage provided to the gridding electrode 58. The high voltage controller 318 may include instructions stored in memory that are executable to implement the methods described in more detail with respect to FIG. 4 and FIG. 5.

Thus, the X-ray generator described above may include an X-ray tube including one or more emitters from which an electron beam is emitted toward a target. The emitter is a part of a cathode (e.g., cathode 62) and the target is an anode (e.g., anode 66), with the target at a substantially higher positive voltage (which may be at ground) than the emitter (which may be at a negative voltage). Electrons from the emitter may be formed into a beam and directed or focused by electrodes (e.g., the gridding electrode 58 and/or electrodes used to set the local electric field on the emitting structure) and/or magnets which are also parts of the cathode. In response to the electron beam impinging the target, the target emits X-rays. The voltage supplied to the electrodes of the cathode may be controlled in order to create X-ray pulses and adjust the intensity or energy of X-rays that are generated. In these systems, with respect to controlling the emitter, it may be desirable to be able to produce fast transitions from low to high voltages, as well as to control voltage waveforms on electrodes voltage values to control the electron beam. Further, the high voltage generator (e.g., the hyper resonant inverter 304) may be turned off between X-ray pulses and turned on a predefined amount of time before an X-ray pulse is commanded to begin (e.g., 1 ms) which may allow the high voltage generator to reach a threshold voltage for initiating the X-ray pulse (e.g., for opening the gridding electrode).

Figure 4:
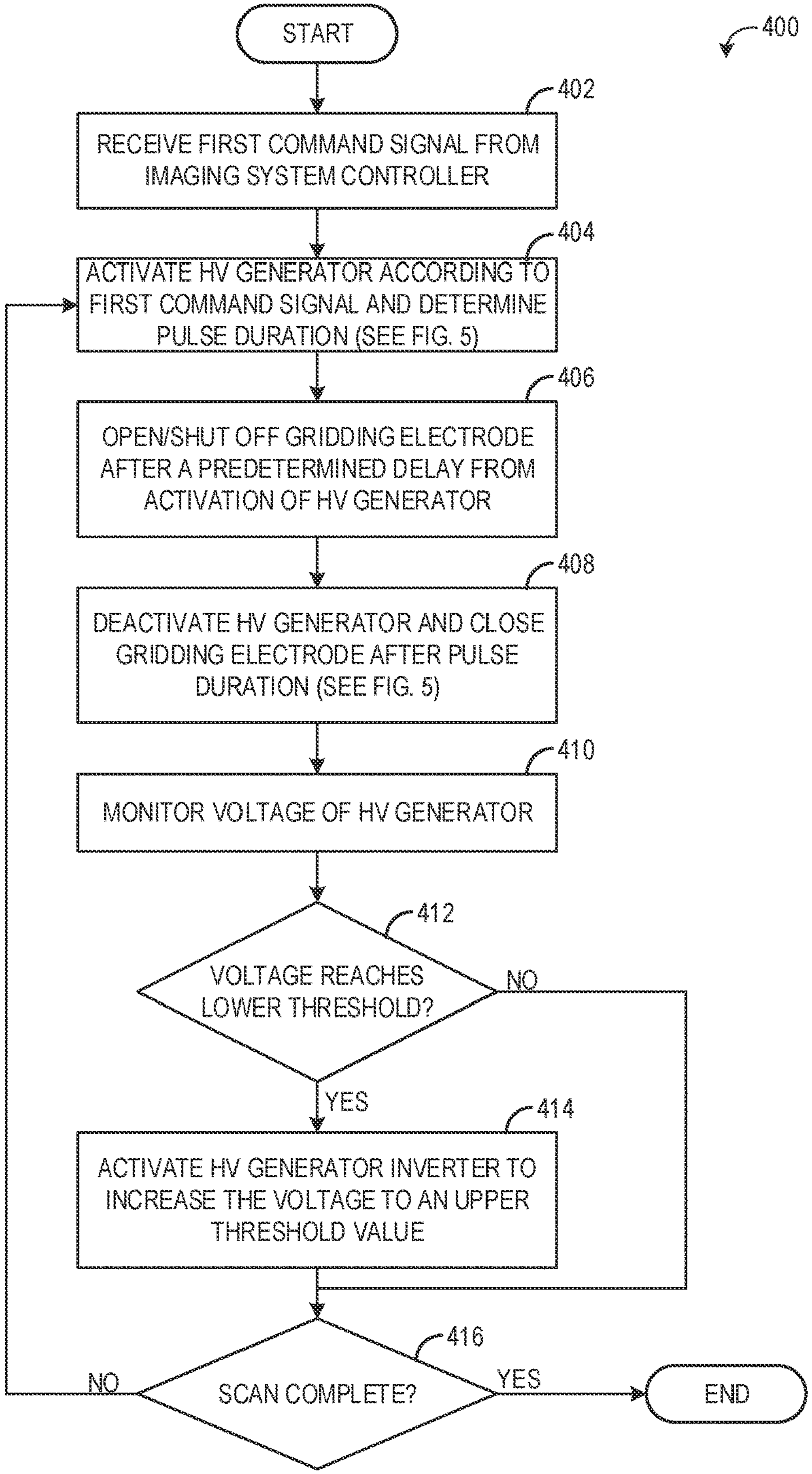
FIG. 4 is a flowchart depicting an example method for operating a high voltage generator to generate an X-ray pulse.

FIG. 4 is a flowchart depicting a method 400 for generating X-ray pulses with an X-ray generator of an imaging system including a high voltage generator, such as X-ray generator 300 of FIG. 3, during a scan of an imaging procedure on an imaging subject carried out with the imaging system, such as the imaging system illustrated in FIG. 10 and presented in more detail below. The method 400 may be executed by a controller storing instructions in memory executable by one or more processors of the controller, such as the high voltage controller 318 of FIG. 3, coupled to the high voltage generator. The controller may receive feedback from various sensors coupled to the high voltage generator and may receive commands or information from a controller of the imaging system.

At 402, the method may include receiving a first command signal from the imaging system (e.g., from the imaging system controller). The imaging system may receive information pertaining to the imaging procedure input by a user (e.g., patient information, a scan prescription that dictates the anatomy being imaged and/or diagnostic goal of the imaging procedure, etc.), and provide a scan duration, X-ray pulse rate, tube current, and voltage that is to be output by the high voltage generator. The first command signal may be a pulsed signal with the pulse timing and duration set according to the information pertaining to the imaging procedure. The scan duration may be conveyed via a scan duration signal, which may be a signal with two modes: active or inactive. The scan may continue as long as the scan duration signal is active, and the scan may end when the scan duration signal changes to inactive, which may be after the predetermined duration of the scan has ended or after a predetermined number of X-ray pulses within the scan has been reached. At 404, the method may include activating the high voltage generator according to the first command signal and beginning the method 500 described with respect to FIG. 5 to determine the duration of the pulse. In some examples, activating the high voltage generator may include activating an inverter of the high voltage generator (e.g., inverter 320 of FIG. 3). Activating the inverter allows the high voltage generator to begin outputting the commanded voltage, but the high voltage generator may not be able to instantaneously output the commanded voltage. In some examples, the high voltage generator may take an amount of time, which may be under 1 ms, to ramp up from a current voltage to begin outputting the commanded voltage. The first command signal may anticipate the time at which the X-ray pulse is to commence, and the inverter is activated before the time at which the X-ray pulse is to commence so that the high voltage generator has enough time to reach the voltage that the high voltage generator is commanded to output (e.g. the commanded voltage). Thus, the time specified in the command signal anticipates an actual time that the X-ray pulse begins. The commanded voltage may be included in the first command signal. In one example the high voltage generator may anticipate the X-ray pulse by 1 ms. The X-ray pulse may be initiated by opening the gridding electrode. The duration of the pulse may be determined by the method 500 of FIG. 5, which may include an iterative process to determine if a requested number of photons have been generated during the pulse based on a parameter, mAs, calculated based on the current through the X-ray tube and the pulse duration. When the value of mAs has reached a requested value, the controller may receive a signal to end the X-ray pulse according to method 500 described with respect to FIG. 5.

At 406, the method may include opening the gridding electrode after a predetermined delay from the activation of the high voltage generator (e.g., opening the gridding electrode at the time when the X-ray pulse is commanded to being as set forth by the first command signal). Opening the gridding electrode allows X-rays to be produced by allowing electrons from the cathode to strike the anode, and the collision of the electrons with the anode produces X-rays. An X-ray pulse is produced as long as the gridding electrode is open and the pulse ends when the gridding electrode is closed. Opening the gridding electrode may include setting the gridding electrode voltage to a predetermined voltage, which in some systems may be between 0V and −1000V. The predetermined delay between the activation of the high voltage generator and opening the gridding electrode allows the high voltage generator an appropriate amount of time to reach the output voltage (e.g., the commanded voltage) demanded by the system (e.g., as specified in the first command signal). The predetermined delay may be determined based on the configuration of the X-ray generator or the duration and voltage demands of the scan and in some examples may be 1 ms.

At 408, the method may include deactivating the high voltage generator after a pulse duration and closing the gridding electrode. The pulse duration may be determined according to the method 500 described in more detail below with respect to FIG. 5. Briefly, the pulse duration is determined based on the total X-ray dose (defined by mAs) requested by the imaging system for the X-ray pulse. The current provided by the high voltage generator and the requested mAs may be used to determine the duration of the pulse. When the controller detects that the X-ray pulse is complete (e.g., based on the pulse duration expiring or based on the mAs being reached, as explained in more detail below), the gridding electrode is closed and the high voltage generator (e.g., the inverter of the high voltage generator) is deactivated. The gridding electrode is activated to prevent electrons from reaching the anode and producing X-rays. The gridding electrode may be activated by supplying a strong negative voltage to the grid, such as −6000V. Deactivating the high voltage generator prevents the high voltage generator from generating voltage, which may reduce the heat generated by the high voltage generator. Due to capacitance in the system (e.g., in the cable connecting the high voltage generator to the X-ray tube) and capacitive elements resist changes in voltage, the voltage supplied to the X-ray tube may not stop instantaneously when the inverter is shut off, but instead may decline slowly.

At 410, the method may include monitoring the voltage of the high voltage generator when the high voltage generator is deactivated. Due to capacitive effects of cables in the system, the voltage at the high voltage generator declines slowly. The voltage may be monitored via signals from a sensor of the high voltage generator that may be configured to measure the voltage and send the measured voltage to the high voltage generator controller (e.g., the voltmeter of the plurality of sensors 324 of FIG. 3). Monitoring the voltage may include determining if the voltage has reached a lower threshold at 412. The lower threshold may be based upon the configuration of the high voltage generator, the predetermined delay, and the commanded voltage, and particularly based on the amount of voltage the high voltage generator can provide during the predetermined delay described with respect to 406 (e.g., the rate at which the voltage may increase once the high voltage generator is activated in order to reach the commanded voltage by the time the X-ray pulse is to begin). At 412, if the voltage has decreased below the lower threshold, method 400 proceeds to 414, where the high voltage generator may be activated (e.g., by activating the inverter) until the voltage reaches an upper threshold. Activating the high voltage generator inverter allows the high voltage generator to function and produce voltage. Voltage may be produced until the voltage reaches the upper threshold. The upper threshold may be based on the commanded voltage, such as being equal to the commanded voltage or within a threshold of the commanded voltage, or the upper threshold may be a standard value applied to a plurality of X-ray procedures. Once the measured voltage reaches the upper threshold voltage, then the high voltage generator is deactivated and the voltage slowly declines from the upper threshold voltage. At 412, if the voltage has not decreased below the lower threshold, the method 400 continues at 416.

At 416, method 400 includes determining if the scan is complete. The scan may be determined to be complete responsive to the scan duration signal switching from active to inactive, or based on a command from the imaging system controller indicating that the scan is complete. If the scan is not complete, the method 400 repeats from 404 until the scan is complete. Once the scan is complete, the X-ray generator is shut down and the method ends. Shutting down the X-ray generator may include shutting off the high voltage generator (if the high voltage generator is on when the scan is determined to be complete), closing the gridding electrode (if the gridding electrode is open when the scan is determined to be complete), and may include shutting down controllers within the system if the entire imaging system is powered down.

Figure 5:
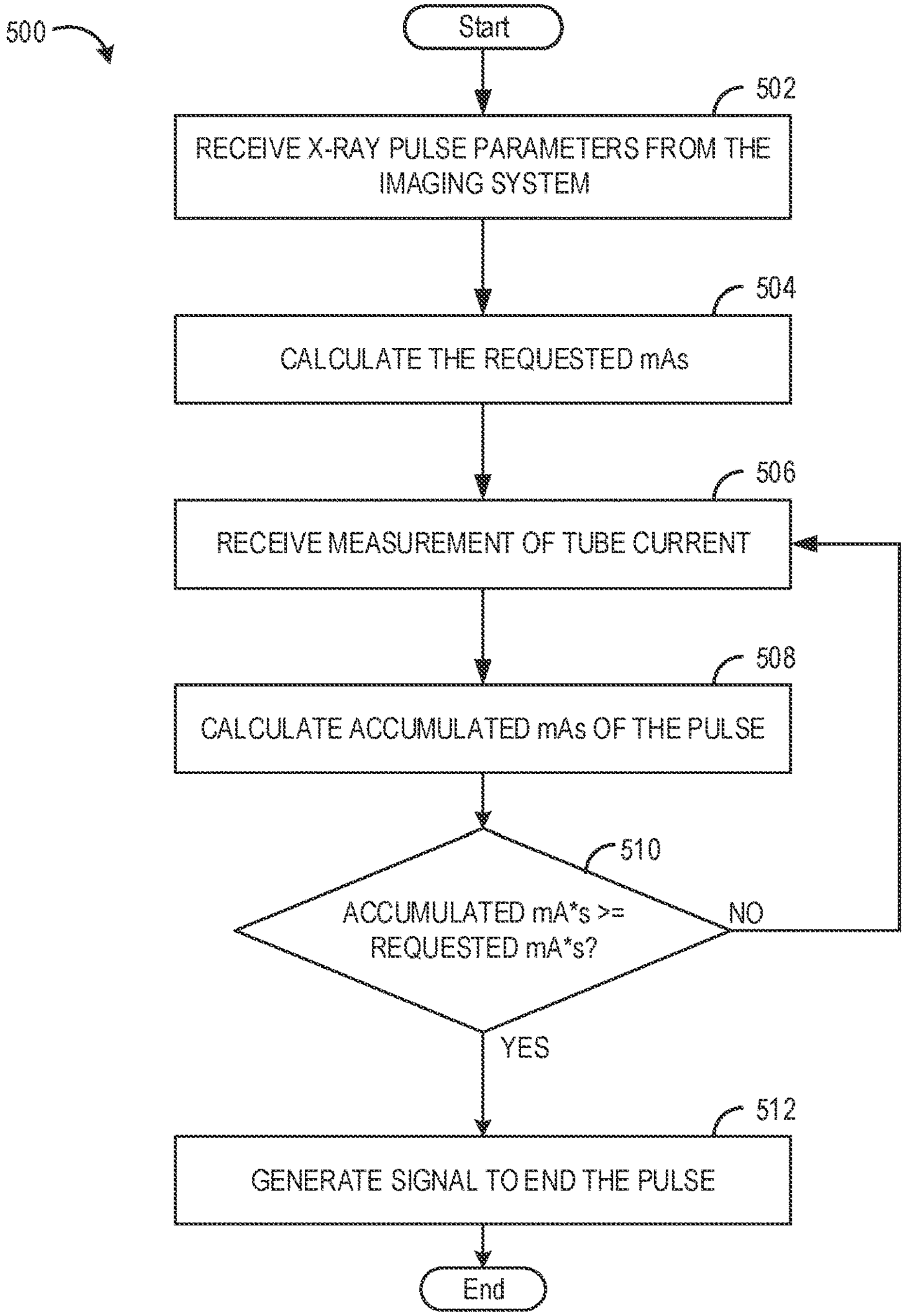
FIG. 5 is a flowchart depicting an example method for determining X-ray pulse duration.

FIG. 5 is a flowchart demonstrating an example method 500 for determining the duration of an X-ray pulse during a scan with an imaging system (e.g., the imaging system of FIG. 10). Method 500 may be performed by a controller such as high voltage controller 318. The method 500 may be initiated at the beginning of an X-ray pulse and may be initiated at the same time as the gridding electrode is opened to start an X-ray pulse. At 502, the method may include receiving X-ray pulse parameters from the imaging system. The imaging system may generate the X-ray pulse parameters based on the scan being performed and send the first command signal (generated based on the plurality of parameters) to the high voltage controller. The X-ray pulse parameters may include the desired voltage produced by the high voltage generator, the desired current through the X-ray tube (e.g., the desired tube current), and the desired duration of the X-ray pulse. The desired voltage may be measured in kV, the desired current may be measured in mA, and the desired duration may be measured in seconds(s). To produce an image from the detector output obtained during the X-ray pulse, a certain number of X-ray photons within a specific range of energies (e.g., within the X-ray frequency range) may be detected by a detector within an X-ray imaging system. Photons within the X-ray frequency range are emitted when electrons with specific kinetic energies strike the anode in the X-ray tube. Electrons are emitted by the cathode and accelerated in an electric field between the cathode and anode within the X-ray tube due to a significant potential difference between the cathode and anode. A single photon is emitted for each electron that strikes the anode, and therefore the number of electrons that strike the anode is proportional to the number of photons emitted from the electrode, and also measured by the X-ray detector (accounting for attenuation of the photons by the imaging subject and scatter). To ensure an image of sufficient brightness is obtained, each scan may have a set X-ray dose (e.g., amount of X-ray photons produced) that is based on the subject being imaged, for example. The number of electrons that strike the anode can be determined using the integral of the tube current in mA with respect to the time the X-ray generator is emitting X-rays in seconds(s). The desired number of electrons is represented by a target mAs for the X-ray generator. Each X-ray pulse may have a desired mAs and the X-ray tube may be controlled to produce a desired tube current and duration to reach the desired mAs. However, the X-ray pulse actually produced by the X-ray tube may differ from the X-ray pulse commanded by the imaging system, but may produce a suitable image if the desired mAs is reached. For example, the X-ray tube includes a filament that is heated (e.g., via the tube current) to produce the electrons. However, the temperature of the filament may affect the tube current (e.g., the tube current may not reach the commanded tube current instantaneously due to the filament temperature), and thus the actual duration of the X-ray pulse may be shorter or longer than the commanded duration to ensure the commanded mAs is reached.

At 504, the method 500 may include calculating the mAs requested by the imaging system. The mAs may depend on the X-ray pulse parameters identified at 502, including the desired image quality, patient size, pulse duration, and tube current. At 506, the method 500 may include receiving the measurement of the tube current from a current sensor that may be coupled to the X-ray tube. At 508, the method 500 may include calculating the accumulated mAs of the pulse. In some examples, calculating the accumulated mAs of the pulse may include integrating measurements of the tube current over time to determine the total mAs generated by the X-ray tube during the pulse. At 510, the accumulated mAs may be compared to the mAs requested by the imaging system. If the accumulated mAs is less than the mAs requested by the imaging system, the method 500 may proceed to 506 and periodically measure the tube current at 506, calculate the accumulated mAs during the pulse at 508, and compare the accumulated mAs to the requested mAs at 510 until the accumulated mAs is greater than or equal to the requested mAs. Once the accumulated mAs is greater than or equal to the requested mAs at 510, the method 500 may include generating a signal to end the X-ray pulse at 512. The signal to end the X-ray pulse may be conveyed to a controller that controls the electrode grid such as controller 318 of FIG. 3, in order to close the electrode grid and deactivate the high voltage generator to end the X-ray pulse. Method 500 may then end.

Figure 6:
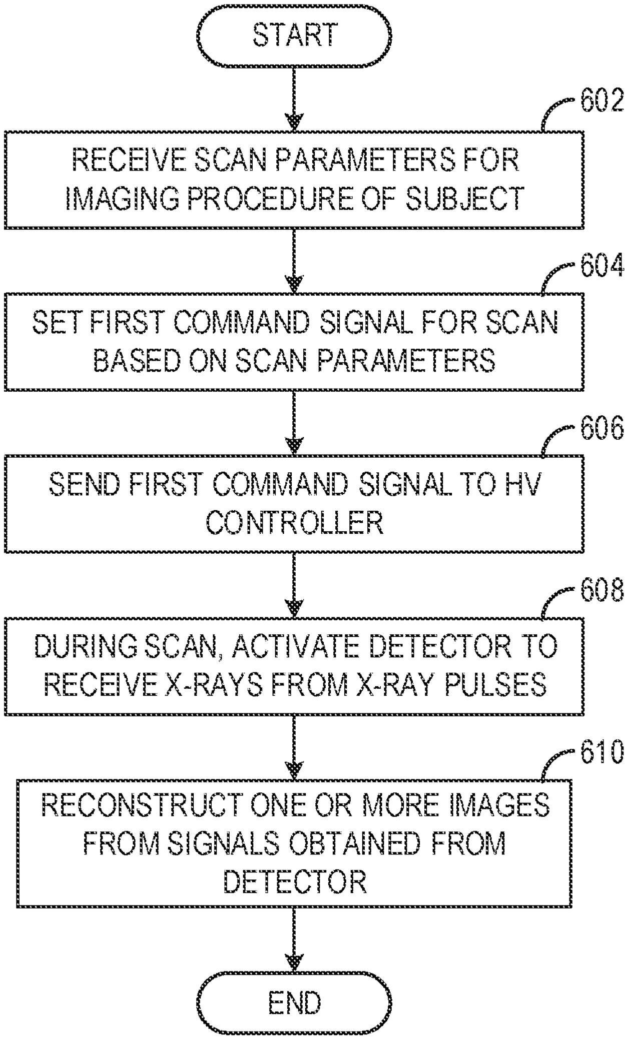
FIG. 6 is a flowchart depicting an example method for an imaging system.

FIG. 6 is a flowchart depicting a method 600 for an imaging system to control the X-ray generator during a pulsed X-ray imaging procedure. An X-ray imaging procedure may include one or more scans and each scan may have the same or different imaging parameters in order to image different anatomies, obtain images at different brightness, etc. The method 600 may be executed by a controller within the imaging system (e.g., the controller within the base unit 1005 of FIG. 10) that may include memory storing instructions and one or more processors to execute instructions to carry out the method. At 602, the method 600 may include receiving one or more scan parameters for a scan of the imaging procedure of the subject. The imaging procedure may include one or more scans and each scan may have its own scan parameters. The scan parameters may include the length of the scan, the frequency of X-ray pulses for the scan, the duration of the X-ray pulses, and the duration of time between X-ray pulses. The scan parameters may be based on the type of imaging procedure being done, the type of scan (e.g., scout/localizer scan versus diagnostic scan), and/or the portion of a subject's body that is being imaged. The scan parameters may be determined based on user input and/or based on a selected scan protocol.

At 604, the method 600 may include setting a first command signal for the scan based on the scan parameters. The first command signal may be a pulsed signal that indicates the timing, duration, and intensity (e.g., current) of the X-ray pulses, and may indicate the operating voltage for the high voltage generator during the scan.

At 606, the method 600 may include sending the first command signal to the high voltage generator controller. The high voltage generator controller may use the first command signal when executing method 400 to control the high voltage generator to create X-ray pulses according to the first command signal. At 608, the method 600 may include activating an X-ray detector of the imaging system to receive X-rays from the X-ray generator during the scan. In some examples, the X-ray detector may be activated in a pulsed manner according to a second command signal, which may be offset (e.g., delayed) relative to the first command signal (e.g., by 1 ms). Additional details about the second command signal are presented below with respect to FIG. 7. At 610, one or more images are reconstructed from signals obtained from the detector during the scan. During each X-ray pulse, X-rays that impinge on the detector are converted to signals by the detector. The signals generated by the detector may be sent to a processor of the imaging system and reconstructed into one or more images. In some examples, one image may be generated for each X-ray pulse. The images may be stored in memory of the imaging system, displayed on a display device associated with the imaging system, and/or sent for long-term storage. In some examples, the generation of the X-ray pulses, obtaining of the detector signals, and reconstruction of images from the detector signals may continue until the scan is complete, which may be indicated via user input or based on the scan protocol. Once the scan is complete, the first command signal may be terminated and the high voltage generator may be deactivated, as explained above.

Figure 7:
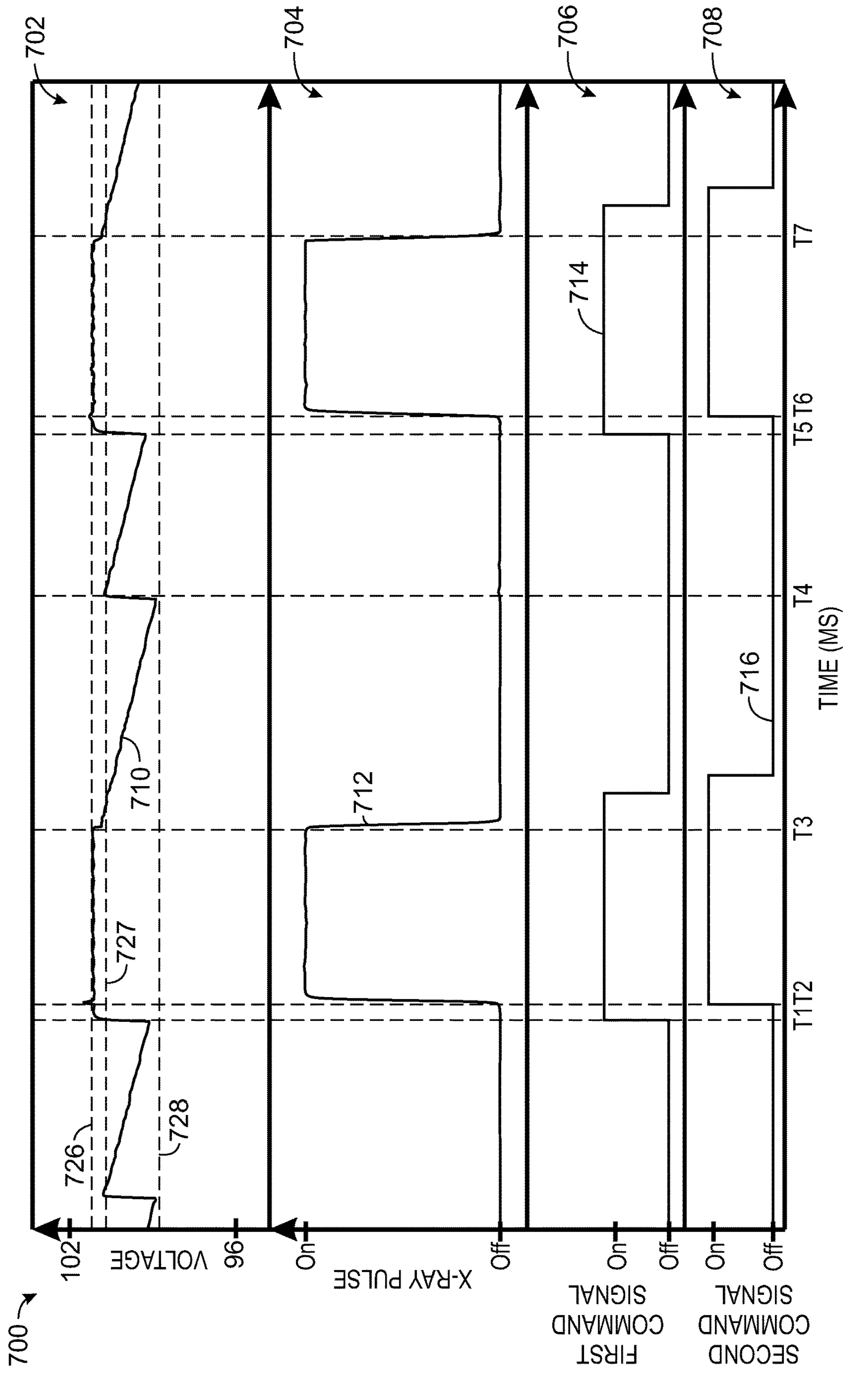
FIG. 7 is an example plot depicting the timing of pulses and measurements associated with the impact of pulses on the high voltage generator and X-ray tube.

FIG. 7 is a timeline plot 700 for the operation of an imaging system (e.g., the imaging system of FIG. 10)

including an X-ray generator (e.g., the X-ray generator of FIG. 3) controlled according to the methods described above, during a scan of an imaging subject. The timeline plot 700 includes a first plot 702 including a first curve 710 showing the voltage between the cathode and anode of the X-ray tube (e.g., the voltage generated by the high voltage generator) as a function of time (with voltage depicted along the y-axis and increasing in the direction of the arrow), a second plot 704 including a second curve 712 showing the X-ray pulse generation as a function of time (with the X-ray pulses being shown in binary, on/off status along the y-axis), a third plot 706 including a third curve 714 showing a first command signal that controls the high voltage generator (with the first command signal being in either on or off state, as shown along the y-axis), and a fourth plot 708 including a fourth curve 716 showing a second command signal that is identical to the first command signal except that it is delayed by a set duration, such as 1 ms. The second command signal may be generated internally by the high voltage controller 318 and controls the start time of the X-ray pulse. The second command signal may be in either on or off state, as shown along the y-axis with a transition from the off to on state corresponding to the beginning of an X-ray pulse. In some examples, the detector may be controlled according to the X-ray pulse signal shown in the second curve 712.

The first plot 702 includes an operating voltage reference line 726 and a minimum voltage reference line 728. The operating voltage reference line 726 represents the voltage that is commanded to be produced by the high voltage generator (e.g., the commanded voltage described above) during an X-ray pulse. The minimum voltage reference line 728 represents a minimum voltage between the cathode and anode that is to be maintained during the scan (e.g., the lower threshold voltage of FIG. 4). If the voltage between the cathode and anode, represented by the first curve 710, decreases to the minimum voltage reference line 728, the high voltage generator is turned on by turning on the inverter to increase the voltage, as explained above with respect to FIG. 4.

The first plot 702, the second plot 704, the third plot 706, and the fourth plot 708 are time-aligned and each depict time (e.g., in ms) along the x axis. The time depicted along the x axis increases from left to right across the figure. Six time points of interest are marked across all plots in the timeline plot 700. Prior to time T1, the high voltage generator is off, as indicated by the decreasing voltage shown by the first curve 710. At T1, the first command signal, as represented by the third curve 714, switches from off to on (e.g., initiates a first system pulse), thereby commanding the high voltage generator to turn on. The first system pulse triggers the activation of the high voltage generator and voltage represented by the first curve 710 increases from its current value to the operating voltage reference line 726. The high voltage generator may continue to produce the operating voltage until the high voltage generator is triggered to turn off at T3. At T2, the gridding electrode is opened, which allows X-rays to be generated; also at T2, the second command signal switches from off to on, which signals the beginning of an X-ray pulse. As a result of the high voltage generator being activated and the gridding electrode opening, the beginning of the first X-ray pulse also occurs at T2, which is shown in the transition of the second curve 712 from the off to on state. When the second plot transitions from the off to on state, the X-ray detector may be triggered, which allows X-rays to be detected by the X-ray detector. The X-ray pulse continues until T3, at which point the X-ray pulse ends due to closing of the gridding electrode. The time between T1 and T2 may be a preset delay to allow the high voltage generator to raise the voltage between the cathode and the anode to the operating level before the X-ray pulse begins. The present voltage delay may be 1 ms in some examples.

At T3, the high voltage generator is turned off and the gridding electrode is closed according to the method 400 described with respect to FIG. 4. The X-ray pulse ends at T3, which is represented on the plot by the transition of the second curve 712 from the on to off state. The end of the X-ray pulse may trigger the X-ray detector to deactivate and stop detecting X-rays. The time between T2 and T3 represents the X-ray pulse duration, which may be determined by method 500 described with respect to FIG. 5 (e.g., the X-ray pulse may have a duration that is based on the commanded mAs and the tube current, and in the example shown in FIG. 5, the actual duration of the first X-ray pulse is shorter than the maximum commanded duration defined by the duration of time the first command signal represented by the third curve 714 remains in the ON position). After T3, the high voltage begins to decrease slowly, shown by the negatively sloped section of the first curve 710 in between T3 and T4. The high voltage decreases slowly between T3 and T4 instead of dropping instantaneously because of capacitive elements in the X-ray generator, such as the cable coupling the high voltage generator to the X-ray tube. At T4, the voltage represented by the first curve 710 has dropped down to the minimum voltage reference line 728. Because the voltage has dropped down to the minimum voltage reference line 728, the high voltage generator is reactivated at T4 by turning the inverter back on. The voltage between the cathode and anode may then rise to an upper threshold voltage 727. Once the voltage between the cathode and anode reaches the upper threshold voltage 727, the high voltage generator is deactivated and the voltage begins to decrease again. The decrease in voltage after the high voltage generator is represented by the negative slope in the section of the first curve 710 between T4 and T5.

At T5, the pulse process repeats. The difference in time between T1 and T5 (e.g., the time between initiation of X-ray pulses) may be an X-ray pulse rate that is determined by the imaging system and scan parameters. At T5, the high voltage generator is activated in response to the first system signal represented by curve 714. At T5, the voltage between the cathode and the anode increases to the operating voltage reference line 726. T5 precedes T6 by a predetermined amount of time, which may be 1 ms in some examples. At T6 the voltage between the cathode and the anode is equal to the operating voltage and the gridding electrode is opened to initiate a second X-ray pulse. Additionally, at T6 the detector is activated, as represented by the second curve 712. The X-ray pulse continues until T7. Additionally, the high voltage generator is shut off at T7. Thus, the high voltage generator is turned off between a first X-ray pulse performed between T2 and T3 and a second X-ray pulse performed between T6 and T7, with no other X-ray pulses performed between the first X-ray pulse and the second X-ray pulse, with each of the first X-ray pulse and the second X-ray pulse performed as part of a single scan/imaging procedure of a patient.

Figure 8:
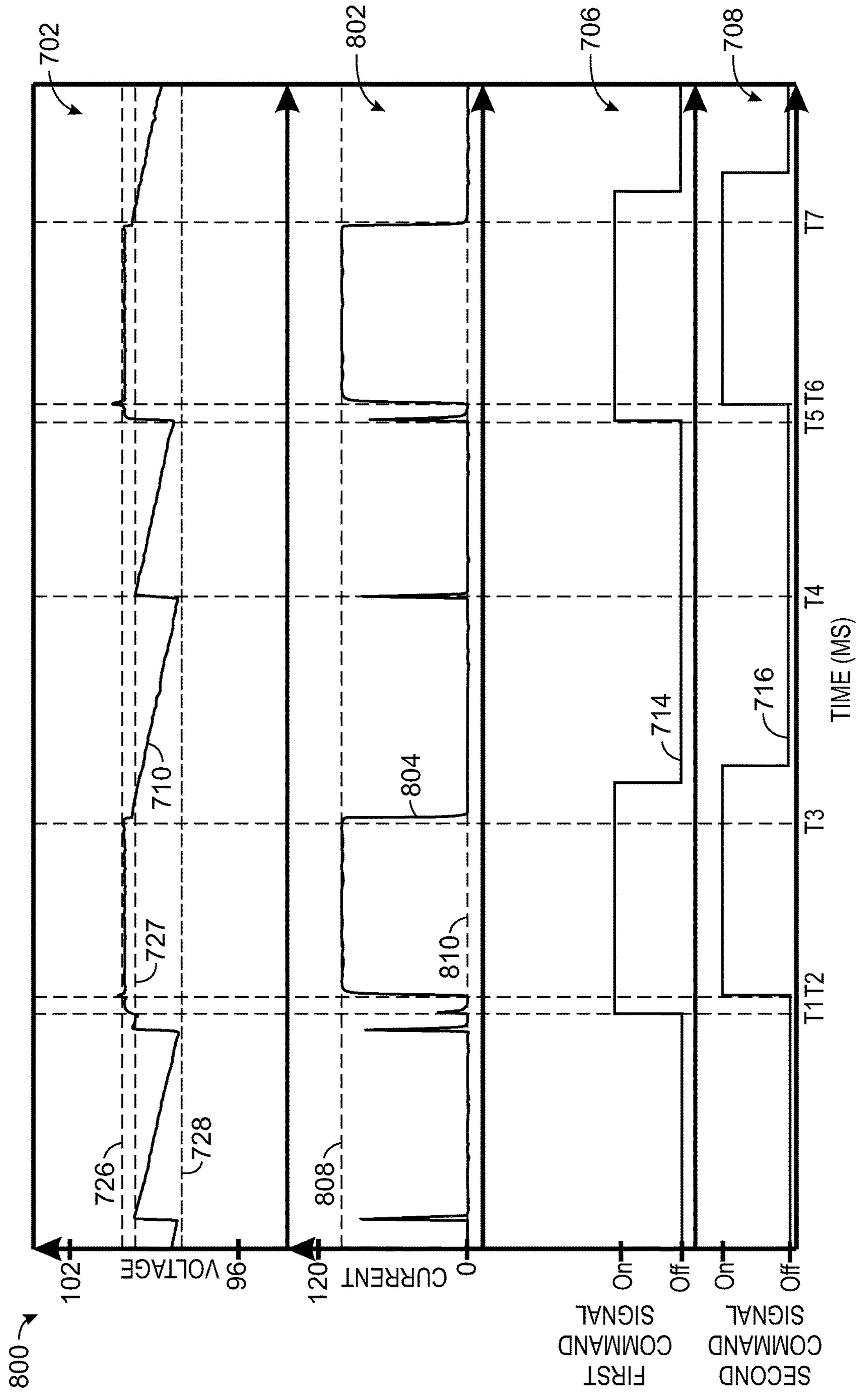
FIG. 8 is an example plot depicting the timing of an X-ray pulse.

FIG. 8 is a timeline plot 800 similar to the one depicted in FIG. 7 (e.g., for the operation of an imaging system (e.g., the imaging system of FIG. 10) including an X-ray generator (e.g., the X-ray generator of FIG. 3) controlled according to the methods described above, during a scan of an imaging subject). Timeline plot 800 includes first plot 702, third plot 706, and fourth plot 708 in their entirety. Timeline plot 800 further includes plot 802 including curve 804 to represent the tube current during the X-ray procedure. Plot 802 includes an operating tube current 808 (e.g., a commanded current) and a minimum tube current 810. The operating tube current may represent the current through the X-ray tube when the gridding electrode is open and an X-ray pulse is in progress. The tube current may be set by the imaging system. The minimum tube current 810 may be the current through the tube when the gridding electrode is closed and an X-ray pulse is not occurring (e.g., when the X-ray tube is deactivated), and is shown as being 0 mA in FIG. 8.

At T2, the gridding electrode is opened and the tube current depicted by curve 804 increases from the minimum tube current 810 to the operating tube current 808. The tube current remains at the operating tube current for the duration of the pulse. The X-ray pulse is concluded by closing the gridding electrode and turning off the high voltage generator according to the method described with respect to FIG. 4. When the gridding electrode is shut off, electrons can no longer flow from the cathode to the anode and the tube current drops from the operating tube current 808 to the minimum tube current 810.

In between X-ray pulses, the high voltage generator may be turned on to prevent the voltage of the high voltage generator from dropping below the lower threshold depicted by the minimum voltage reference line 728 and/or to recharge the cable coupling the high voltage generator to the X-ray tube, each of which may cause current spikes, as shown at T1, T4, and T5, for example.

At T6, the gridding electrode is opened to initiate a second X-ray pulse and the tube current depicted by curve 804 increases from the minimum tube current 810 to the operating tube current 808. The tube current remains at the operating tube current 808 for the duration of the second X-ray pulse, which is between T6 and T7. The pulse pattern may be repeated until the X-ray imaging procedure is completed, at which point the high voltage generator is shut off, the system signals are discontinued and the tube current remains at 0 mA until another X-ray imaging procedure is started.

Figure 9:
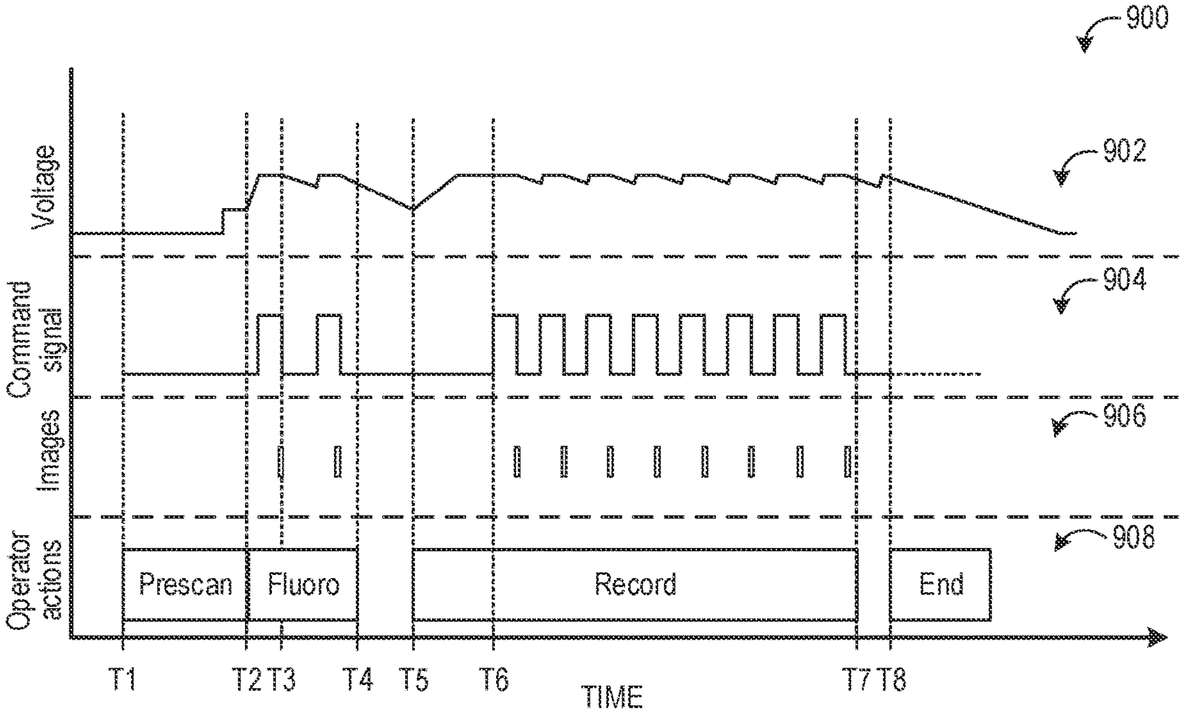
FIG. 9 is a timeline depicting events of interest during an imaging procedure.

FIG. 9 shows a timeline 900 of events of interest during an X-ray imaging procedure of a subject carried out by an imaging system, such as the imaging system of FIG. 10. The timeline 900 includes a first plot 902 depicting high voltage generator voltage as a function of time; a second plot 904 depicting a first command signal sent from a controller of the imaging system to a high voltage generator controller; a third plot 906 schematically depicting image reconstruction and display as a function of time; and a fourth plot 908 schematically depicting operator actions (e.g., user input received by the imaging system) as a function of time. Each of the plots is time aligned, with time increasing along the x-axis. Time points of interest are depicted along the x-axis.

Prior to time T1, the imaging system may be off or in a standby mode, and the high voltage generator may be deactivated. At time T1, the operator of the imaging system initiates an X-ray imaging procedure that includes a prescan phase from time T1 to time T2. During the prescan phase, the operator may position the imaging system at a desired location relative to the patient, select a scan protocol or otherwise set parameters for the scan, etc. In some examples, the high voltage generator may be activated and may begin to start generating voltage during the prescan phase, and current may be provided to the X-ray tube to heat the filament of the X-ray tube in anticipation of generating X-rays to carry out one or more scans of the X-ray imaging procedure. At time T2, the operator initiates one or more fluoroscopy scans. Each fluoroscopy scan may result in generation (and display) of an image, referred to as a fluoroscopy image. The fluoroscopy images may be used to confirm that the anatomy of interest is positioned in the field of view of the imaging system and/or set the X-ray dose for any subsequent scans. As shown, two images may be generated during the fluoroscopy scans, such as a first image at time T3. The command signal may instruct the high voltage generator to be activated and generate voltage at a commanded voltage to generate an X-ray pulse. Once the X-ray pulse has reached its commanded duration, the high voltage generator may be deactivated. Thus, during the fluoroscopy scan phase, the high voltage generator may be turned off between X-ray pulses.

Between time T4 and time T5, the command signal may be in the "off" state and the high voltage generator may be deactivated. At time T5, the operator initiates a record imaging phase that includes acquisition and display of images at a predefined frame rate. In response to initiation of the record imaging phase, a preparation phase is performed (e.g., between T5 and T6) during which time the high voltage generator is turned on to heat the filament. Further, the anode of the X-ray tube is spun up and brought to a commanded speed. At T6, imaging may commence and the first command signal may toggle between on and off in order to command the high voltage generator to activate and deactivate to generate X-ray pulses, as explained above. In the example shown, each X-ray pulse has a duration that is sufficient to obtain detector signals for reconstructing one image. Thus, the X-ray pulse rate may match the record imaging frame rate. In between each X-ray pulse, the high voltage generator is deactivated and the voltage starts to decay. However, the next X-ray pulse is initiated and the high voltage generator activated before the voltage can drop to the lower threshold.

The record imaging phase is deactivated at time T7, and thus the high voltage generator is deactivated. Because the imaging procedure is still active, the high voltage generator voltage continues to be monitored and the high voltage generator is activated when the voltage drops to the lower threshold. At time T8, the operator indicates that the imaging procedure is complete, and the command signal terminates. The high voltage generator is deactivated and the voltage is no longer monitored. As such, the voltage of the high voltage generator is allowed to drop to zero. In this way, at least during the record imaging phase, the high voltage generator is turned off between each X-ray pulse of a plurality of X-ray pulses, wherein the plurality of X-ray pulses is performed during a single imaging procedure of an imaging subject.

The X-ray generator described in FIGS. 1-3 may be integrated into a system capable of creating images of patients. An example of one such imaging system is displayed in FIG. 10. In FIG. 10 an imaging system 1000 including a C-arc 1002 (which may be referred to herein as a C-shaped gantry) is schematically shown. Imaging system 1000 may be referred to herein as an interventional imaging system and/or C-arc imaging system. The imaging system 1000 includes a radiation source, and in the examples described herein, the radiation source is an X-ray unit 1008 (which may be referred to herein as an X-ray tube) positioned opposite to detector 1030 (which may be referred to herein as an X-ray detector) and configured to emit X-ray radiation. The imaging system 1000 additionally includes base unit 1005 supporting imaging system 1000 on ground surface 1090 on which the imaging system 1000 sits (e.g., via base 1022 supported by wheel 1024, wheel 1026, etc.).

The C-arc 1002 includes a C-shaped portion 1003 connected to an extended portion 1007, with the extended portion 1007 rotatably coupled to the base unit 1005. The detector 1030 is coupled to the C-shaped portion 1003 at a first end 1050 of the C-shaped portion 1003, and the X-ray unit 1008 is coupled to the C-shaped portion 1003 at an opposing, second end 1052 of the C-shaped portion 1003. As an example, the C-arc 1002 may be configured to rotate at least 180 degrees in opposing directions relative to the base unit 1005. The C-arc 1002 is rotatable about at least a rotational axis 1064 and may additionally rotate about axis 1067. The C-shaped portion 1003 may be rotated as described above in order to adjust the X-ray unit 1008 and detector 1030 (positioned on opposite ends of the C-shaped portion of the C-arc 1002 along axis 1066, where axis 1066 intersects rotational axis 1064 and extends radially relative to rotational axis 1064) through a plurality of positions.

During an imaging operation (e.g., a scan), a portion of a patient's body placed in an opening formed between the X-ray unit 1008 and detector 1030 may be irradiated with radiation from the X-ray unit 1008. For example, patient 1034 may be supported by a patient support table 1036, with the patient support table 1036 including a support surface 1038 and base 1040, and may be arranged between the X-ray unit 1008 and the detector 1030. The X-ray unit 1008 includes an X-ray tube insert 1009 and X-ray radiation generated by the X-ray tube insert 1009 may emit from the X-ray unit 1008. The radiation may penetrate the portion of the patient's body arranged to be irradiated and may travel to the detector 1030 where the radiation is captured (e.g., intercepted by a detector surface 1013 of the detector 1030). By penetrating the portion of the patient's body placed between the X-ray unit 1008 and detector 1030, an image of the patient's body is captured and relayed to an electronic controller 1020 of the imaging system 1000 (e.g., via an electrical connection line, such as electrically conductive cable 1061). The image may be displayed via display device 1018. Images of the subject acquired by the imaging system 1000 via the X-ray unit 1008 and the detector 1030 as described above may be referred to herein as projection images and/or scan projection images.

The base unit 1005 may include the electronic controller (e.g., a control and computing unit) that processes instructions or commands sent from the user input devices during operation of the imaging system 1000. The base unit 1005 may also include an internal power source (not shown) that provides electrical power to operate the imaging system 1000. Alternatively, the base unit 1005 may be connected to an external electrical power source to power the imaging system 1000. A plurality of connection lines (e.g., electrical cables, such as electrically conductive cable 1061) may be provided to transmit electrical power, instructions, and/or data between the X-ray unit 1008, detector 1030, and the control and computing unit. The plurality of connection lines may transmit electrical power from the electrical power source (e.g., internal and/or external source) to the X-ray unit 1008 and detector 1030. In some examples, the base unit 1005 may include the high voltage generator of FIG. 3. In other examples, the high voltage generator or FIG. 3 may be housed externally to the base unit 1005 and coupled via a cable to the base unit 1005.

The C-arc 1002 may be adjusted to a plurality of different positions by rotation of the C-shaped portion 1003 of the C-arc 1002. For example, in an initial, first position shown by FIG. 1, the detector 1030 may be positioned vertically above the X-ray unit 1008 relative to a ground surface 1090 on which the imaging system 1000 sits, with axis 1066 arranged normal to the ground surface 1090 intersecting a midpoint of each of the outlet 1011 of X-ray unit 1008 and detector surface 1013 of detector 1030. The C-arc 1002 may be adjusted from the first position to a different, second position by rotating the C-shaped portion 1003. In one example, the second position may be a position in which the X-ray unit 1008 and detector 1030 are rotated 180 degrees together relative to the first position, such that the X-ray unit 1008 is positioned vertically above the detector 1030, with axis 1066 intersecting the midpoint of the outlet 1011 of the X-ray unit 1008 and the midpoint of the detector surface 1013 of the detector 1030. When adjusted to the second position, the X-ray unit 1008 may be positioned vertically above the rotational axis 1064 of the C-shaped portion 1003 of the C-arc 1002, and the detector 1030 may be positioned vertically below the rotational axis 1064. Different rotational positions of the C-arc 1002 are possible.

A technical effect of turning off a high voltage generator of an imaging system between X-ray pulses is that power consumption by the imaging system may be reduced and thermal stress of the high voltage generator may be lowered, thereby prolonging the lifespan of the high voltage generator.

The disclosure also provides support for a method for an interventional imaging system, comprising: generating a plurality of X-ray pulses with an X-ray tube of the interventional imaging system, each X-ray pulse generated by supplying voltage to the X-ray tube from a high voltage generator and opening a gridding electrode of the X-ray tube, and turning off the high voltage generator between each X-ray pulse. In a first example of the method, generating the plurality of X-ray pulses comprises receiving a command signal specifying a time at which the high voltage generator is to be activated in order to generate a first X-ray pulse of the plurality of X-ray pulses and turning on the high voltage generator at the time specified by the command signal. In a second example of the method, optionally including the first example, turning on the high voltage generator comprises activating an inverter of the high voltage generator to supply voltage to the X-ray tube. In a third example of the method, optionally including one or both of the first and second examples, generating the plurality of X-ray pulses further comprises initiating the first X-ray pulse by opening the gridding electrode after the time specified by the command signal. In a fourth example of the method, optionally including one or more or each of the first through third examples, opening the gridding electrode after the time specified by the command signal comprises opening the gridding electrode 1 ms after the time specified by the command signal. In a fifth example of the method, optionally including one or more or each of the first through fourth examples, the time specified in the command signal anticipates an actual time that the first X-ray pulse begins. In a sixth example of the method, optionally including one or more or each of the first through fifth examples, generating the plurality of X-ray pulses further comprises terminating the first X-ray pulse by closing the gridding electrode and turning off the high voltage generator. In a seventh example of the method, optionally including one or more or each of the first through sixth examples, the method further comprises: obtaining signals from a detector of the interventional imaging system during the first X-ray pulse, and reconstructing an image from the signals. In an eighth example of the method, optionally including one or more or each of the first through seventh examples, the method further comprises: between X-ray pulses, monitoring a voltage of the high voltage generator and turning on the high voltage generator responsive to the voltage of the high voltage generator dropping below a threshold voltage.

The disclosure also provides support for an imaging system, comprising: a high voltage generator configured to supply voltage to an X-ray tube including a gridding electrode, and a controller storing instructions in memory executable by one or more processors of the controller to: receive a command signal specifying a respective time at which the high voltage generator is to be activated to initiate each of a plurality of X-ray pulses, including a first time to initiate a first X-ray pulse of the plurality of X-ray pulses and a second time to initiate a second X-ray pulse of the plurality of X-ray pulses following the first X-ray pulse, activate the high voltage generator at the first time, and initiate the first X-ray pulse by commanding the gridding electrode to open after the first time, close the gridding electrode and deactivate the high voltage generator upon completion of the first X-ray pulse, and activate the high voltage generator at the second time, and initiate the second X-ray pulse by commanding the gridding electrode to open after the second time. In a first example of the system, the second X-ray pulse is performed after the first X-ray pulse with no other X-ray pulses occurring between the first X-ray pulse and the second X-ray pulse. In a second example of the system, optionally including the first example, the gridding electrode is opened 1 ms after the first time and the gridding electrode is closed upon completion of the first X-ray pulse. In a third example of the system, optionally including one or both of the first and second examples, the instructions are further executable to monitor a voltage of the high voltage generator when the high voltage generator is deactivated between the first X-ray pulse and the second X-ray pulse, and activate the high voltage generator in response to the voltage dropping to a first threshold voltage, even if the second time has not yet been reached. In a fourth example of the system, optionally including one or more or each of the first through third examples, the instructions are further executable to, upon activating the high voltage generator in response to voltage dropping to the first threshold voltage, deactivate the high voltage generator in response to the voltage of the high voltage generator reaching a second threshold voltage. In a fifth example of the system, optionally including one or more or each of the first through fourth examples, the plurality of X-ray pulses is performed during a single imaging procedure of an imaging subject.

The disclosure also provides support for a method for an interventional imaging system including a high voltage generator configured to supply voltage to an X-ray tube, the X-ray tube including a gridding electrode, the method comprising: performing a first X-ray pulse of a plurality of X-ray pulses of an imaging procedure, including activating the high voltage generator before opening the gridding electrode to initiate the first X-ray pulse and closing the gridding electrode to terminate the first X-ray pulse, deactivating the high voltage generator upon completion of the first X-ray pulse, and reactivating the high voltage generator and then opening the gridding electrode to perform a second X-ray pulse of the plurality of X-ray pulses. In a first example of the method, the method further comprises: obtaining signals from a detector of the interventional imaging system during the first X-ray pulse, and reconstructing an image from the signals. In a second example of the method, optionally including the first example, the second X-ray pulse is performed after the first X-ray pulse with no other X-ray pulses between the first X-ray pulse and the second X-ray pulse, and wherein the high voltage generator is maintained deactivated between the first X-ray pulse and the second X-ray pulse. In a third example of the method, optionally including one or both of the first and second examples, the second X-ray pulse is performed after the first X-ray pulse with no other X-ray pulses between the first X-ray pulse and the second X-ray pulse, and wherein the high voltage generator is reactivated one or more times between the first X-ray pulse and the second X-ray pulse to maintain a voltage of the high voltage generator above a lower threshold.

As used herein, the term "approximately" is construed to mean plus or minus five percent of the range unless otherwise specified.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an interventional imaging system, comprising:

generating a plurality of X-ray pulses with an X-ray tube of the interventional imaging system, each X-ray pulse of the plurality of X-ray pulses generated by supplying voltage to the X-ray tube from a high voltage generator and opening a gridding electrode of the X-ray tube; and turning off the high voltage generator between each X-ray pulse of the plurality of X-ray pluses, wherein generating the plurality of X-ray pulses comprises receiving a command signal specifying a time at which the high voltage generator is to be activated in order to generate a first X-ray pulse of the plurality of X-ray pulses, turning on the high voltage generator at the time specified by the command signal, and initiating the first X-ray pulse by opening the gridding electrode after the time specified by the command signal.

2. The method of claim 1, wherein turning on the high voltage generator comprises activating an inverter of the high voltage generator to supply voltage to the X-ray tube.

3. The method of claim 1, wherein opening the gridding electrode after the time specified by the command signal comprises opening the gridding electrode 1 ms after the time specified by the command signal.

4. The method of claim 1, wherein the time specified in the command signal anticipates an actual time that the first X-ray pulse begins.

5. The method of claim 1, wherein generating the plurality of X-ray pulses further comprises terminating the first X-ray pulse by closing the gridding electrode and turning off the high voltage generator.

6. The method of claim 1, further comprising obtaining signals from a detector of the interventional imaging system during the first X-ray pulse, and reconstructing an image from the signals.

7. The method of claim 1, further comprising, between X-ray pulses, monitoring a voltage of the high voltage generator and turning on the high voltage generator responsive to the voltage of the high voltage generator dropping below a threshold voltage.

8. An imaging system, comprising:
- a high voltage generator configured to supply voltage to an X-ray tube including a gridding electrode; and
- a controller storing instructions in memory executable by one or more processors of the controller to:
  - receive a command signal specifying a respective time at which the high voltage generator is to be activated to initiate each of a plurality of X-ray pulses, including a first time to initiate a first X-ray pulse of the plurality of X-ray pulses and a second time to initiate a second X-ray pulse of the plurality of X-ray pulses following the first X-ray pulse;
  - activate the high voltage generator at the first time, and initiate the first X-ray pulse by commanding the gridding electrode to open after the first time;
  - close the gridding electrode and deactivate the high voltage generator upon completion of the first X-ray pulse; and
  - activate the high voltage generator at the second time, and initiate the second X-ray pulse by commanding the gridding electrode to open after the second time.

9. The imaging system of claim 8, wherein the second X-ray pulse is performed after the first X-ray pulse with no other X-ray pulses occurring between the first X-ray pulse and the second X-ray pulse.

10. The imaging system of claim 8, wherein the gridding electrode is opened 1 ms after the first time and the gridding electrode is closed upon completion of the first X-ray pulse.

11. The imaging system of claim 8, wherein the instructions are further executable to monitor a voltage of the high voltage generator when the high voltage generator is deactivated between the first X-ray pulse and the second X-ray pulse, and activate the high voltage generator in response to the voltage dropping to a first threshold voltage, even if the second time has not yet been reached.

12. The imaging system of claim 8, wherein the plurality of X-ray pulses is performed during a single imaging procedure of an imaging subject.

13. The imaging system of claim 11, wherein the instructions are further executable to, upon activating the high voltage generator in response to voltage dropping to the first threshold voltage, deactivate the high voltage generator in response to the voltage of the high voltage generator reaching a second threshold voltage.

14. A method for an interventional imaging system including a high voltage generator configured to supply voltage to an X-ray tube, the X-ray tube including a gridding electrode, the method comprising:
- performing a first X-ray pulse of a plurality of X-ray pulses of an imaging procedure, including activating the high voltage generator before opening the gridding electrode to initiate the first X-ray pulse and closing the gridding electrode to terminate the first X-ray pulse;
- deactivating the high voltage generator upon completion of the first X-ray pulse; and
- reactivating the high voltage generator and then opening the gridding electrode to perform a second X-ray pulse of the plurality of X-ray pulses, wherein the second X-ray pulse is performed after the first X-ray pulse with no other X-ray pulses between the first X-ray pulse and the second X-ray pulse, and wherein the high voltage generator is reactivated one or more times between the first X-ray pulse and the second X-ray pulse to maintain a voltage of the high voltage generator above a lower threshold.

15. The method of claim 14, further comprising obtaining signals from a detector of the interventional imaging system during the first X-ray pulse, and reconstructing an image from the signals.

* * * * *